May 10, 1949.  R. F. NOWALK  2,469,779
VEHICLE GOVERNOR
Filed May 23, 1945
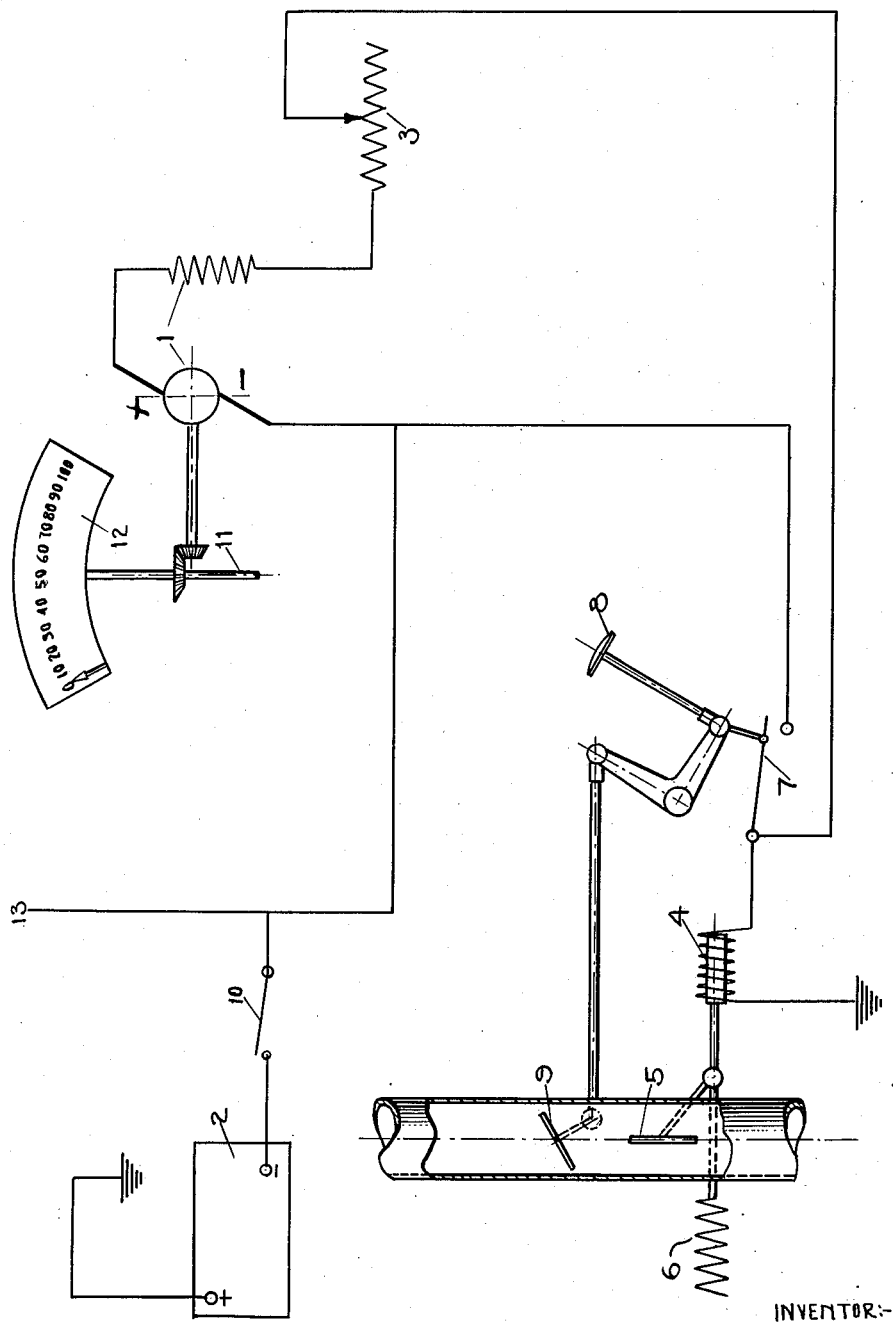
INVENTOR:-
Robert F. Nowalk.
BY Herbert S. Fairbanks ATT.

Patented May 10, 1949

2,469,779

UNITED STATES PATENT OFFICE 2,469,779

VEHICLE GOVERNOR

Robert F. Nowalk, Philadelphia, Pa.

Application May 23, 1945, Serial No. 597,143

2 Claims. (Cl. 180—82.1)

The object of this invention is to devise a novel speed controlling device for motor vehicles which will automatically prevent the vehicle exceeding a selected, maximum speed, but which, at the will of the driver, may be rendered inoperative to permit operation of the motor vehicle at a speed greater than said selected, maximum speed, and when the emergency for which the extra speed was needed is past the control returns to its setting for said selected, maximum speed.

The conventional accelerator pedal when moved to its extreme open position renders the automatic control inoperative so that in case of an emergency, such as for example passing another vehicle or to avoid an accident, the driver can increase the speed of the motor vehicle above that set by the automatic control.

With the foregoing and other objects in view as will hereinafter clearly appear, my invention comprehends a novel governor.

It further comprehends a novel control wherein the full potential of a battery can be impressed on a solenoid to effect the opening of an auxiliary throttle valve in the fuel inlet.

For the purpose of illustrating one manner of carrying out the invention in practice, I have shown in the accompanying drawing a preferred embodiment of it which will give satisfactory and reliable results. It is, however, to be understood that the various instrumentalities of which the invention consists can be variously arranged and organized and the invention is not limited to the exact arrangement and organization of these instrumentalities as herein set forth.

The drawing is a schematic view of a vehicle governor, embodying my invention.

Referring to the drawing:

The electrical control means includes a generator 1 and a storage battery 2. One side of the generator has a line provided with a rheostat 3 and leads to a solenoid 4 connected by a linkage with an auxiliary throttle valve 5 in the fuel inlet of the engine. A spring 6 tends to close the throttle valve 5.

A short circuiting switch 7 is linked to an accelerator pedal 8, and the latter is operatively connected with the main throttle valve 9 to actuate it. The switch 7 is in a line from one side of the generator connected with the line from the other side of the generator to the solenoid. The line having the switch 7 is connected with the battery 2 by a line containing an ignition switch 10.

The generator 1 is driven by the conventional speedometer shaft 11 which controls a speedometer 12.

One side of the battery and one side of the solenoid are grounded.

The rheostat 3 has a variable resistance with suitable actuating means, and is calibrated and graduated to indicate the predetermined speed to which the governor is manually set.

The operation will now be apparent to those skilled in this art and is as follows:

When the vehicle engine is not in operation, the governor generator is not in operation. Under such condition when the ignition switch 10 is closed, the electrical circuit is completed so that the full potential is impressed upon the solenoid and acting against the spring 6 causes a full opening of the auxiliary throttle valve 5.

After the vehicle is in motion, the generator driven by the vehicle through the speedometer shaft 11 generates a current whose potential varies with the speed at which it is driven. The polarity of the current generated is connected so as to oppose the current of the storage battery and therefore limiting the flow of current through the solenoid thereby allowing the spring 6 to partially close the auxiliary throttle valve 5 limiting the rotative speed of the engine to correspond to the vehicle rate of speed set by the adjustment of the rheostat 3.

The suitably calibrated rheostat 3 allows for varying the resistance to the current flowing through the solenoid 4 which means provides the predetermined rate of speed setting of this governing mechanism.

If at anytime that the vehicle is in motion, it is desired to instantly increase the speed above that for which the rheostat 3 is set, upon pressing the accelerator pedal 8 down to its extreme position; switch 7 is closed which impresses the full battery potential upon the solenoid which opens the auxiliary throttle valve to its full open position rendering the governing function inoperative until such time as the pressure upon the accelerator pedal is sufficiently relaxed to open switch 7 and the governing means is returned to its functional condition.

In the foregoing description, it will be seen that the electrical energy generated by the motion of the vehicle is used to oppose the energy supplied by the storage battery to operate the governing means.

The battery 2 serving the ignition circuit as well as the governor is part of the vehicle's usual equipment and is charged by the generator supplied with the vehicle for such purpose.

The generator 1 is used only to generate an E. M. F. proportional to the vehicle's speed and to actuate the governor only and is not intended to charge the battery. The polarity of the generator is such that as its E. M. F. increases it will counteract the effect of the battery 2 upon the solenoid 4 and allow the spring 6 to close the valve 5. If the battery is connected so that the positive side is grounded as shown in the drawings, then the terminal of the generator which leads to the rheostat 3 is positive.

The arrangement of the linkage operating the throttle 9 and the short circuiting switch 7 is such that the throttle 9 may be partially opened or fully closed without affecting switch 7. However, when the accelerator pedal 8 is pressed down to its extreme position, the switch is closed.

A micro-switch capable of being actuated by a motion as small as .005 of an inch may be used for this so that for all practical purposes the throttle 9 may be opened to practically its wide open position before the short circuiting switch is closed.

What I claim and desire to secure by Letters Patent of the United States is as follows:

1. In a motor vehicle speed governor, a fuel inlet, an auxiliary throttle valve in said inlet, a spring tending to close said throttle valve, a solenoid connected with said auxiliary throttle valve to open it in opposition to the force of said spring tending to close it, a battery, an accelerator controlled switch, a generator driven by the speedometer shaft of the motor vehicle, a rheostat to select a predetermined speed, said generator being connected at one side to both the battery and the accelerator controlled switch and at its other side to the rheostat, and means to short circuit the generator and impress the full potential of the battery upon said solenoid to effect the opening of the auxiliary throttle valve when it is desired to increase the speed above the maximum speed set by said rheostat, and the release of said short circuiting means causing the speed to be that set by the rheostat.

2. In a motor vehicle speed governor, a fuel inlet, an auxiliary throttle valve in said fuel inlet, a spring tending to close said throttle valve, an electric circuit controlling said throttle valve comprising a solenoid connected with said auxiliary throttle valve to actuate it to open position in opposition to the force of the spring tending to close it, a battery, an accelerator controlled switch, a generator driven by the speedometer shaft of the motor vehicle, connected at one side to both the battery and the accelerator controlled switch, a line from the other side of the generator to the solenoid, a rheostat in said line to provide a maximum speed as selected by the rheostat, and an accelerator pedal connected with said switch to close it and short circuit the generator when the pedal is moved to its extreme open position, and thereby provide a speed greater than the maximum selected speed set by the rheostat.

ROBERT F. NOWALK.

REFERENCES CITED

The following references are of record in the file of this patent:

UNITED STATES PATENTS

| Number | Name | Date |
|---|---|---|
| 1,248,130 | Kammerhoff | Nov. 27, 1917 |
| 2,077,555 | Frantz | Apr. 20, 1937 |
| 2,174,972 | Dach | Oct. 3, 1939 |